Feb. 27, 1951 V. C. STEVENS 2,543,073
METHOD AND MEANS FOR PRINTING AND
ENLARGING PICTURES IN COLOR
Filed April 29, 1942

INVENTOR
VERNUM C. STEVENS
BY William D. Hall.
ATTORNEY

Patented Feb. 27, 1951

2,543,073

UNITED STATES PATENT OFFICE 2,543,073

METHOD AND MEANS FOR PRINTING AND ENLARGING PICTURES IN COLOR

Vernum C. Stevens, West Point, N. Y.

Application April 29, 1942, Serial No. 440,892

7 Claims. (Cl. 95—2)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a method of, and to means for, printing and enlarging color pictures.

One object of my invention is to provide a system and a method of color printing by the use of lenticular film and conjugately formed contacting printing materials.

Another object of my invention is to provide a contact printing material, consisting of a base imprinted or engraved with sets of fine color lines or markings, and covered with an emulsion layer that is shaped to embody a lenticulate surface, with the area of projection of each lenticule, on the base, covering, and corresponding to, the area occupied by one set of color lines.

Another object of my invention is to provide a printing material of the foregoing character in which the lenticules are shaped to fit and nest with conjugate lenticules of a negative.

Another object of my invention is to provide a printing material for enlargement consisting of a base imprinted or engraved with sets of fine color lines, and covered with an emulsion layer and provided with printed markings properly positioned to permit light through the exposed film to properly affect the appropriate area of the printing material for enlargement.

Another object of my invention is to provide a colored transparency, by means of which a colored print or colored projection plate or slide may be made.

Another object of my invention is to provide a combination of a color film and a conjugate transparent film to form a nested element for making enlarged colored prints.

Another object of my invention is to provide a combination of an exposed color film having primary color exposure markings, and a conjugate film with printed subtractive color markings to form a nested element, with the exposure markings and the printed markings properly positioned to permit light through the exposed film to properly affect the appropriate area of the conjugate film.

Figure 1:
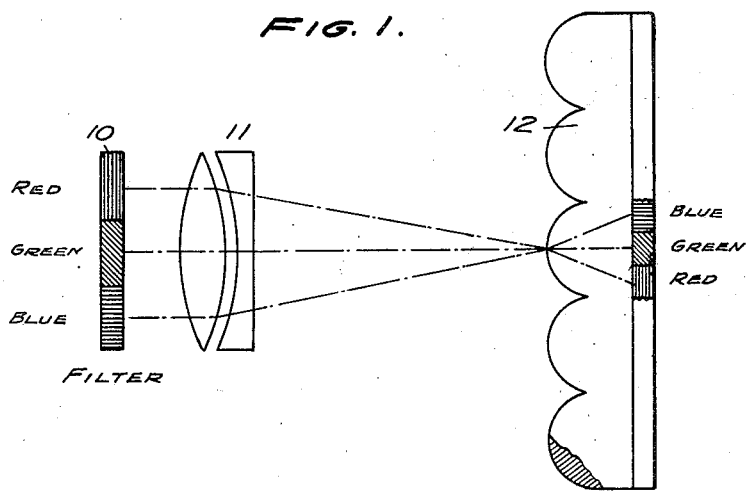
Figure 2:
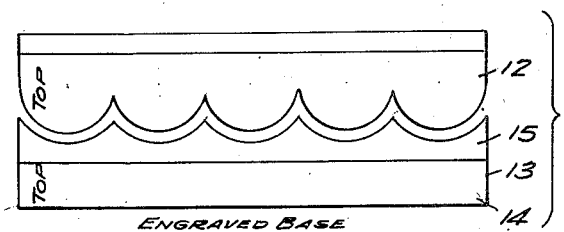
Figure 4:
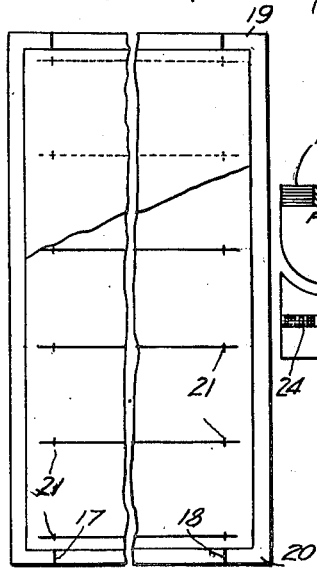
Figure 3:
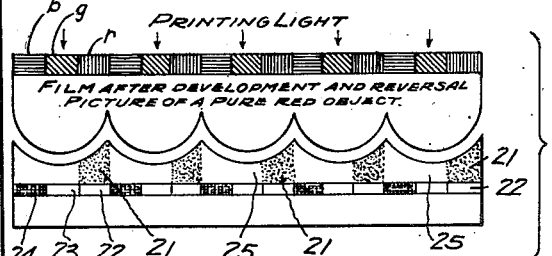

The manner in which my invention is applied, is illustrated in the accompanying drawings, in which:

Figure 1 of the drawings illustrates schematically the arrangement of a three-color filter, a lens objective, and a lenticular film that is to be exposed to form a color negative;

Figure 2 is a schematic end view, showing the manner in which the lenticular film of Figure 1, after development, is applied to and nested with a conjugate printing material for contact printing;

Figure 3 is a similar schematic end view, illustrating the principle or theory of action, whereby the colored developed negative establishes a corresponding color effect on the printing material; and Figure 4 is an exaggerated enlarged view of a portion of a concavely lenticulated film, illustrating the provision end arrangement of marking lines or other indicia for the negative and the other printing materials.

In Figure 1 of the drawings, the basic elements of this color photography system are illustrated, schematically, as comprising a color filter 10, a lens objective 11, and a lenticular film 12. The negative (in reality a positive) is made on Berthon lenticular film as shown in Figure 1. Any camera may be used if the filter is placed at the optical center of the objective. Satisfactory results may be obtained however with a slip on filter if the focal length of the camera is not too great or if the curvature of the lenticules is designed for the particular focal length. At least 133 lenticules to the inch are desired. The more lenticules per inch the finer the colored print will be. The film is developed and reversed in the usual way.

At the reversal, exposure correction may be effected by varying the time of re-exposure, as is well known to those skilled in the art.

As schematically indicated in Figure 1, each lenticule on the negative is exaggerated and greatly modified for clearer illustration. The lenticular cut surface serves as a lens to condense the light, received by the lenticule, upon the area of projection of the lenticule upon the emulsion at the base of the lenticular film.

In Figure 2, the exposed and developed lenticular film 12 is shown as applied to and nested on a concave lenticular film or print paper 13. The material 13 may be made of direct printing paper where a contact print is desired, or it may be of transparent film where it is desired to project light through the exposed negative 12, if that negative has been reversed for projection purposes, or for printing enlarged photoprints.

As shown in Figure 2, the printing material 13 consists of a base 14, covered with a layer of emulsion 15. The top surface of the emulsion 15 is provided with concave lenticules of the same spacing and curvature as the convex lenticules of the negative, so the negative and the printing material will nest when properly engaged.

As seen from Figure 2, the concave lenticulations on the printing material are cut in the emulsion only, and, furthermore, the concave lenticulations are cut to fit the lenticulations on the convex lenticular film, thus giving perfect registration. For the purpose of the invention the printing material is made with an opaque or opalescent base of any suitable plastic or non-stretching material. Upon this base there is engraved or printed fine lines dyed yellow, magenta and cyan (one set per lenticule and opposite the blue, green and red respectively on the lenticular convex film). The exact color of the lines will vary in the manufacture so that when placed on the base of the printing material they will be subtractive compliments of the three colors in the filter respectively.

Upon the engraved or printed base there is now placed an opaque sensitized emulsion of the gelatine or "Wash-off" type. The concave lenticulations are then rolled, cut or pressed into the emulsion parallel and in proper relation to the engraved or printed fine lines on the base. The opaque emulsion should be white or slight off shades. It forms the final whites on the finished print. If cream tones are desired as in portraits a cream colored emulsion may be used.

The printing material for enlargement is manufactured in the same manner as the printing material except that the concave lenticulations in the emulsion are unnecessary. The width of the sets of color lines on the printing material for enlargement is some multiple of the width of the lenticulations of the negative material and is marked as hereinafter described by a series of dots near the margin.

In order to insure that all of the work is done with the correct color areas in juxtaposition, both the film and the printing material are preferably marked with suitable indicia to permit proper registration of the co-operative colored areas, and to assure proper nesting of the convex and the concave lenticules. For that purpose, the film 19, the negative 12, and the printing material 13 may be marked with the word "Top."

The printing material emulsion has a chlorobromide speed and after contact printing in a pressure printing frame to insure juxtaposition it is developed in a standard oxidizing developer, washed, tanned and bleached in a standard tanning and bleaching solution, developed in warm water to remove the opaque emulsion in spots not affected by the light and then fixed and cleared with hypo and a permanganate clearing bath. The picture which is a series of fine lines in the subtractive colors is hardened and dried. (If the printing material is of the "dyed" line type all solutions after the oxidizing developer must contain a fixative for the dyes.) Four factors provide correction during the development:

(1) The method and degree of bleaching which can change gamma by adding blacks.

(2) The treatment of the lines which are to be engraved with dyes incorporating coupling mordants and thus allowing selective color intensification. This step may be done at a later date if desired. (If the material is of the printed type this step cannot be resorted to.)

(3) Control can be exercised in the hot water rinse where the colors can be diluted by not completely washing away the opaque covering emulsion.

(4) For scenes incorporating large amounts of blue a printing material is to be provided that has its colors so arranged that the blue and green are to be reversed in the tri-color filter. The normal positions of the colors in the filter are as shown in Figure 1.

The procedure in making an enlarged print is as follows:

(1) The convex lenticular film is placed in the enlarger, smooth side toward the light, together with a transparent piece of concave lenticular film of the same or similar material as the original lenticular film and with the same number of lenticulations per inch. The transparent concave film such as 13 is placed in juxtaposition with the convex lenticular film 12 in such a manner that the two form a sandwich in the enlarger. This sandwich is held in juxtaposition by means of the ordinary double glass negative carrier provided in enlargers. The transparent piece of concave lenticular film 13 mentioned herein has drawn on it two lines 17 and 18 on its opposite edges 19 and 20 or at its diagonal corners, or some other suitable place outside the picture area on the lenticular side and perpendicular to the lenticulations, as shown in Figure 4. These lines are drawn in such a manner that they touch the crests of the concave lenticulations only and under magnification would appear as a series of dots 21. Each piece of the printing material for enlargement also has such lines near its margin.

(2) The enlarger is simultaneously moved and focused until the projected dots from the transparent piece of lenticular film in the enlarger register with the dots on the printing material for enlarging. For this purpose a margin trimmed off a discarded sheet of printing material for enlargement may be used. A magnifier of the type now furnished with enlargers will be needed to test this. This registration insures the exact multiple of the enlargement for which the enlarging printing material is designed, and, when once found, the enlarger (if of the precision type) may be left set or marked in such a manner as to insure resetting at the same point and focus. The safety filter is removed from the lens as soon as the dots are properly registered on the printing material for enlargement and the proper exposure is given.

(3) The printing material for enlarging after exposure is processed in the same manner as the contact print.

The colored transparency is made by sandwiching the positive or negative convex lenticular film with a transparent concave lenticular film screen made like the printing material and is engraved with lines of the proper color except it has a transparent base and a clear and non-sensitized emulsion. The transparency screen may also be made of a solid transparent material in the concave lenticular form or it may be a plain screen engraved in lines of the proper color.

The black and white print is made on direct reversal paper by any of the published processes.

The manner in which the process works will be appreciated upon reference to the drawings. If a picture were taken of a solid red object, the film 12 of Figure 1, when exposed through the filter, as shown, and then developed and reversed, would have all of its red strip areas clear and the blue and the green strip areas dark. Then when the film would be placed on the printing material and the latter exposed through the film and subsequently developed, the cyan or minus red strips would remain covered with the opaque emulsion, and the areas of the printed or lined yellow and magenta strips would show, and would combine to give the effect of red.

In the same manner, the printing material would be caused to give the other color effects, according to the color effects on the negative.

The arrangement in Figure 3 illustrates how the color effect of red is established. In the film 12 of Figure 1, after exposure and development, the emulsion is clear over all the red areas (marked $r$), but over the blue ($b$) and over the green ($g$) areas the emulsion is dark. Consequently, when the film 12 is nested with the printing material 13 of Figure 3, and is printed, the light passes through the clear red ($r$) areas of film 12, and exposes the area sections 21, of the emulsion 15, directly above the red lined cyan (minus red) areas 22. Those exposed sections 21 become opaque, and cover the minus red areas 22, while the adjacent minus blue and minus green areas 23 and 24 of the base show through the clear emulsion 25 and combine to create a red effect.

I claim:

1. A photographic record element comprising a support having disposed on one surface as a base, a series of unit groups of lines in the three subtractive primary colors; and a covering layer of emulsion having its exposed surface concavely lenticulated, with each group of lines disposed to be within the projected area of its associated lenticulation.

2. A photographic record element comprising a support having disposed on one surface, as a base, a series of adjacent groups of parallel lines respectively in the three subtractive primary colors; and a covering layer of emulsion over said lined surface, the layer of emulsion having its exposed surface concavely lenticulated, with each concave lenticule disposed so its projected area on the base will include the three subtractive colors of a unit group.

3. A photographic record element comprising: a supporting base; on the base, a series of adjacent groups of parallel lines, each group including lines of three primary colors; a layer of emulsion covering the base, the outer surface of the emulsion being concavely lenticulated, and each concave lenticule being so located that its projected area on the base includes one group of parallel lines.

4. A photographic record element, as described in claim 3, in which the three primary colors are additive.

5. A photographic record element, as described in claim 3, in which the base is opaque.

6. A photographic record element, as described in claim 3, in which a portion of the free surface of the emulsion which is not to be used as part of the photograph bears indicia in the form of dotted lines, these lines being at right angles to the length of the lenticules and the dots appearing only where the lines cross the crests of the lenticules.

7. In a process for making a photographic print from a film upon a sensitized element in which said film comprises a developed film having a transparent base, a convexly lenticulated surface and three line images in registration with each lenticule, and in which said sensitized element comprises a base on which there is a series of adjacent groups of three parallel lines, each group including lines of the three primary colors, a covering layer of photographically sensitive emulsion on the base, the outer surface of the layer being concavely lenticulated to match the convex lenticules of said film, each concave lenticule being in registration with one group of said parallel lines, the steps comprising: placing the film in matching and nesting contact with the element, passing light through the film thus exposing the element, removing the film and developing the exposed element to produce a photographic print.

VERNUM C. STEVENS.

REFERENCES CITED

The following references are of record in the file of this patent:

UNITED STATES PATENTS

| Number | Name | Date |
| --- | --- | --- |
| 561,687 | McDonough | June 9, 1896 |
| 1,822,489 | Kanolt | Sept. 8, 1931 |
| 1,854,864 | Semenitz | Apr. 19, 1932 |
| 1,882,131 | Finlay | Oct. 11, 1932 |
| 1,962,679 | Baker et al. | June 12, 1934 |
| 1,970,311 | Ives | Aug. 14, 1934 |
| 1,984,471 | Fischer | Dec. 18, 1934 |
| 1,989,553 | Kanolt | Jan. 29, 1935 |
| 2,154,868 | Genies | Apr. 18, 1939 |
| 2,155,075 | Adam | Apr. 18, 1939 |
| 2,203,651 | Capstaff | June 4, 1940 |

FOREIGN PATENTS

| Number | Country | Date |
| --- | --- | --- |
| 745,942 | France | Feb. 27, 1933 |
| 789,471 | France | Aug. 19, 1935 |